United States Patent
Little, Jr.

[15] 3,650,605
[45] Mar. 21, 1972

[54] INTERFEROMETRIC APPARATUS WITH CONTROLLED SCANNING MEANS

[72] Inventor: William S. Little, Jr., Rochester, N.Y.
[73] Assignee: Xerox Corporation, Stamford, Conn.
[22] Filed: Oct. 15, 1970
[21] Appl. No.: 80,879

[52] U.S. Cl. ................................. 350/163, 350/3.5, 350/7, 350/320
[51] Int. Cl. ............................. G02b 27/00, G02b 17/00
[58] Field of Search .................. 350/6, 3.5, 7, 162 R, 163, 350/320

[56] References Cited

UNITED STATES PATENTS 3,530,442  9/1970  Collier et al. .......................... 350/3.5
3,110,762  11/1963  Frank ...................................... 350/6

Primary Examiner—David Schonberg
Assistant Examiner—Robert L. Sherman
Attorney—Albert A. Mahassel, James J. Ralabate and Michael J. Colitz, Jr.

[57] ABSTRACT

Apparatus is herein disclosed for exposing a recording plane to an interferometric exposure pattern composed of a set of light interference fringes. A beam of highly coherent collimated light is split into at least two beams and the split beams recombined in a recording plane to create an interference pattern of light and dark fringes. At least one flat glass plate is repositionable in the unsplit light beam and serves to shift the position of the light beam whereby the beam of light leaving the plate is substantially parallel to the light beam entering the plate. This, in turn, causes the illuminated portion of the recording plane to be shifted to a new location without altering the phase relationship between the various beams at any point in the recording plane. Each bright fringe therefore remains in a stationary position and only changes in intensity as the exposure pattern is scanned in the recording plane. The movement of the plate is programmed so that the illumination is scanned in the recording plane to produce a uniform exposure of the interference fringe pattern.

11 Claims, 7 Drawing Figures

INVENTOR.
WILLIAM S. LITTLE

ATTORNEY

Patented March 21, 1972

INTERFEROMETRIC APPARATUS WITH CONTROLLED SCANNING MEANS

This invention relates to apparatus for uniformly exposing a recording surface to a light interference fringe pattern where the recording surface extends beyond the boundary of the exposure pattern.

In U.S. Pat. No. 3,507,564 issued to Franks, there is disclosed method and apparatus for producing a diffraction grating by optically etching an interference fringe pattern upon a photochemically treated exposure surface. Basically, the diffraction pattern is created by illuminating the interference fringes in the exposure plane by recombining a previously split beam of monochromatic light using well known interferometric imaging techniques. However, the exposure region in Franks is restricted to the boundaries of the illuminated pattern and thus limits the size of the grating that can be produced using this method. Extending the original exposure region beyond the boundaries of the original image by means of known beam scanning means has heretofore not proven feasible. Most conventional scanning techniques involve imparting an angular motion to the interfering light beams which introduces a phase change in the interference pattern and thus altering the location of the interferometric line fringes. Furthermore, due to the inherent characteristics of most known sources of monochromatic light, the intensity pattern of the illumination produced in the exposure plane is nonuniform. When the photochemical material or the like is exposed to this nonuniform illumination, some areas in the illuminated region become overdeveloped while, simultaneously therewith, other areas remain underdeveloped.

It is therefore a primary object of this invention to improve method and apparatus for optically reproducing a uniform and stable interferometric line pattern.

It is a further object of this invention to provide scanning means for producing a uniform exposure of a stable interferometric line pattern over a region that extends beyond the boundaries of the exposure pattern.

These and other objects of the present invention for producing a uniform exposure of a stable interferometric line pattern over an extended recording plane are attained by providing apparatus including an illumination source for directing a collimated beam of coherent light incident upon a beam splitter, a light redirecting means for superimposing the split beam of light in a recording plane to produce a set of light interference fringes therein, optical means to displace the original unsplit beam of light from its original beam position to an offset beam position so that the offset beam of light is substantially parallel to the original beam of light, and control means operatively associated with the optical means to regulate the rate of displacement of the original unsplit beam so as to scan the illuminated interferometric line pattern in the recording pattern in a manner to produce a uniform exposure of the fringe pattern over the extended recording plane.

For a better understanding of this invention as well as other objects and further features thereof, reference is had to the following detailed description to be read in connection with the accompanying drawings wherein.

Figure 1:
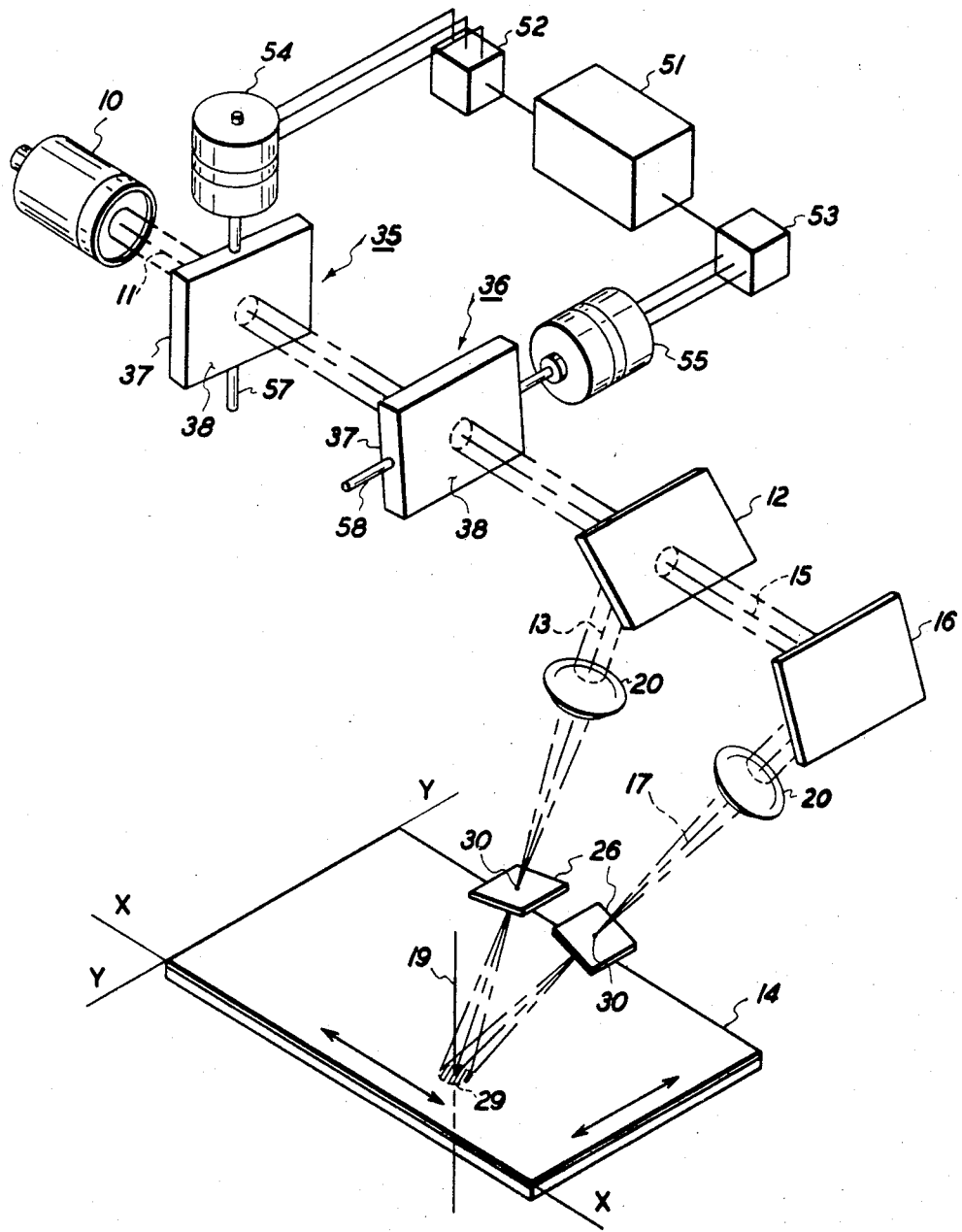
FIG. 1 is a schematic view in perspective of apparatus for producing an interferometric line pattern in accordance with the teachings of the present invention.

Referring now specifically to FIG. 1, there is illustrated a schematic arrangement of apparatus embodying the teachings of the present invention. A point source of light energy 10 is arranged to direct a beam of highly coherent collimated light 11 incident upon a beam splitter 12 wherein a portion of the light energy is redirected along a first optical path 13 towards a recording plane 14 described by the ($x$) and ($y$) coordinates. The remaining light energy passes through the beam splitter and is redirected by means of reflecting surface 16 along a second optical path 17 towards the recording plane. The beam splitter and the reflecting surface are arranged so that the two redirected light beams are superimposed at the recording plane.

Two identical projection lenses 20 are mounted in each of the optical paths associated with the redirected beams as illustrated in FIG. 1. The lenses serve to both expand the original image in the recording plane and to convert the original planar wave front of light entering the lens to a spherical wave front. The light beams recombine in the recording plane to produce an extremely stable interference pattern in the manner of Fresnel's briprism or Young's double pinhole device.

Any dirt or dust in the beam is capable of diffracting the collimated light and thus introduce unwanted noise in the exposure or recording plane. A spatial filter 26 is positioned in the back focal plane of each lens having a pinhole aperture 30 therein centered about the lenses focal spot. The filter thus prevents most of the extraneous noise from reaching the exposure plane. The filters are preferably the last optical component in the system in order to minimize the amount of extraneous noise that is recorded in the recording plane.

Figure 2:
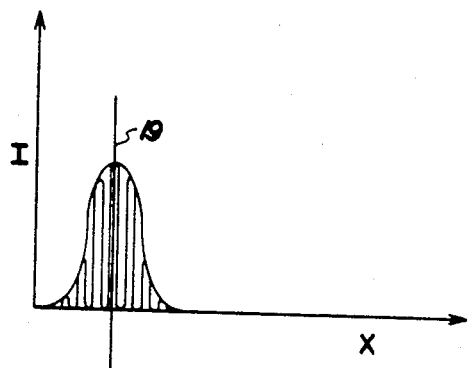
FIG. 2 is a diagrammatic representation of the instantaneous intensity pattern produced in the recording plane of the apparatus shown in FIG. 1.

The laser, because it produces nearly monochromatic light, is preferred as a source of illumination in the practice of the present invention. The energy distribution of most lasers, however, is gaussian in form and therefore unsuited for producing uniform illumination. Even though the light experiences a change in waveform as it moves through the system, the energy distribution of the interference pattern reflects that of the source and is also gaussian in shape. The instantaneous distribution of energy is graphically illustrated in FIG. 2 wherein the intensity (I) of the energy is plotted against displacement from the optical center line 19 of the interference pattern along the (X) coordinates of the recording plane. As can be seen, a great deal of the radiant energy is concentrated about the center of the output image with the energy falling off rapidly from the central portion of the image in all directions.

The output beam 11 of the illumination source is typical for most lasers in that the beam is relatively narrow, generally being about the same width as an ordinary pencil. The relatively narrow beam must be scanned across the recording plane in order to accomplish complete exposure thereof. However, conventional scanning techniques cannot be used in the present apparatus because these methods generally involve angularly displacing one or more of the light beams. This, in turn, changes the phase relationship between the interfering beams and hence causes a shift in the position of the individual interference fringes.

Means are herein provided for exposing the recording plane of the present apparatus to the moving gaussian shaped intensity pattern without altering the position of the individual interference fringes. Movement of the fringe pattern in the recording plane is herein accomplished by means of a pair of transparent plates, preferably constructed of glass, that are rotatably supported in light beam 11 at a position prior to splitting the beam as illustrated in FIG. 1. Although not necessary for the practice of the present invention, the axis of rotation associated with each of the glass plates is illustrated passing near the optical center line of the original beam 11 whereby the plates can be easily repositioned in the light beam. Each plate is provided with a light receiving surface 37 and a light exit surface 38 that are substantially flat and parallel to each other. When the plates are positioned with the light receiving surfaces normal to the original beam 11, the light rays travel in a straight line from the source to the beam splitter. However, obliquely repositioning either of the plates within the beam laterally shifts the original light in a manner wherein the beam leaving the plate is substantially parallel to the beam entering the plate.

Figure 4:
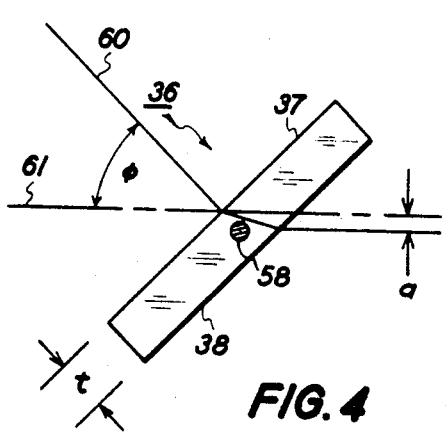
FIG. 4 is an end view of a transparent plate employed in the present apparatus for repositioning the original light beam prior to splitting the beam.

As illustrated in FIG. 4, a single ray passing through the obliquely positioned plate act in accordance with Snell's Law at each interface. Although, as noted, the emerging light beam is parallel to the entering light beam, it nevertheless is laterally displaced some distance therefrom and the displacement distance increases as the angle of incidence ($\phi$) increases. It has been found experimentally, that by holding the emerging beam parallel to the entering beam in the manner disclosed, the intensity pattern can be shifted in the recording plane without disturbing the positions of the individual interferometric fringe lines.

A test was conducted employing apparatus similar to that herein disclosed in which a single ¼ inch thick glass plate was rotatably supported in the output beam of a laser in the manner described. The edges of the plate were masked with an opaque tape and the flat parallel faces rotated through the laser beam at approximately 180 r.p.m. by using a motor as a drive means. In this manner, the illuminated areas was repeatedly scanned across the recording plane. A portion of the recording plane was then observed under a 500X microscope revealing that the fringe pattern, in the observed region, was extremely stable with no discernible movement being noted in the light and dark fringe areas. The bright fringes remained in a stationary position and only the level of intensity of these fringe changes as the illuminated exposure pattern was scanned over the observed region.

Figure 5:
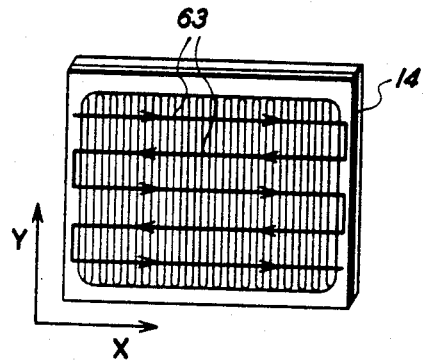
FIG. 5 is a perspective view of the recording plane of the apparatus illustrated in FIG. 1 showing the exposure pattern generated in the recording plane by the present apparatus.

The positioning of the individual light transmitting plates 35 and 36 is controlled through means of a programming network consisting of the digital computer means 51, a pair of pulse generators 52 and 53 and two reversible stepping motors 54 and 55. Plates 35 and 36 are rotatably supported on shafts 57 and 58 respectively, and the shaft directly coupled to the associated stepping motors as illustrated in FIG. 1. Plate 36 serves to control the horizontal sweep of the illumination pattern as it is scanned in the ($x$) direction of the recording plane as seen in FIGS. 1 and 5. Plate 35 is similarly arranged to control the vertical position of the scanning pattern as it moves in the ($y$) direction of the readout plane.

In operation, a predetermined motion is imparted to the horizontal control plate 36 by the previously described control network whereby the light entrance face 37 is rotated through the entering light beam over a prescribed path of travel. For example, as shown in FIG. 4, the normal 60 to the light entrance surface is moved about 45° on either side of the optical centerline 61 of the entering beam which results in the illumination pattern being scanned in the ($x$) direction of the recording plane. Through means of the reversible stepping motor 55, the light entrance surface of plate 36 is swept back and forth over the prescribed path of travel to produce the horizontal trace depicted by the sweep lines 63 in FIG. 5. After completion of each individual horizontal sweep, and before the direction of sweep is reversed, the vertical control plate 35 is repositioned in the entering light beam by means of the associated stepping motor 54 whereby the return sweep traces a path of travel substantially parallel to the subsequent trace in the recording plane as illustrated in FIG. 5.

Figure 3:
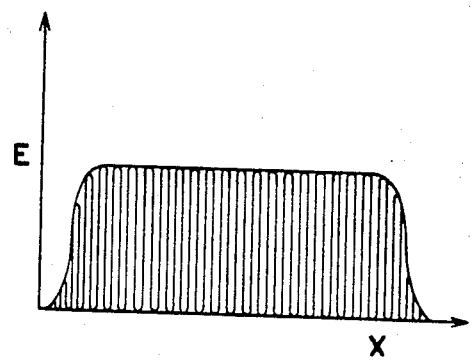
FIG. 3 is a diagrammatic representation of the time average exposure produced in the recording plane of the apparatus shown in FIG. 1.
Figure 7:
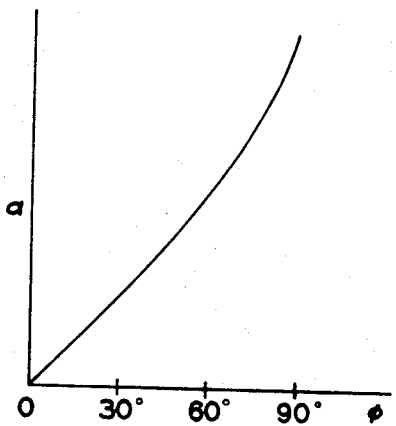
FIG. 7 is a graphical representation of linear beam displacement plotted against angular displacement of the plate.

The curve illustrated in FIG. 7 represents lateral beam displacement as a function of angular plate displacement in apparatus of the type herein disclosed, that is, a device using a flat plate as a beam scanning means. In this arrangement, it is possible to express the lateral beam displacement ($a$) in terms of the angular displacement ($\phi$) of the light entrance surface from the normal line 60 (FIG. 4). This relationship is $$a = t \sin \phi \left[ 1 - \sqrt{\frac{1 - \sin^2 \phi}{n^2 - \sin^2 \phi}} \right]$$

where:

$t$ represents the thickness of the plate
$n$ represents the index of refraction of the plate material
$\phi$ is the angle of incidence As can be seen from the curve the function is relatively linear for the first 30° of plate displacement to either side of the normal line. Thereafter the function becomes nonlinear in that the rate of change of the beam displacement per unit change of angular plate displacement increases. It follows therefore that, for a constant angular displacement of the plate, a nonuniformity of exposure will be produced in the recording plane. The digital computer means 51 is herein provided to individually control the output of each of the pulse generators 52, 53 whereby the stepping motor 54, 55 electrically coupled thereto, are incrementally repositioned in a manner to program the motion of the plates whereby a substantially uniform time average exposure of the illumination pattern is produced in both the ($x$) and ($y$) direction of the recording plane. The resultant exposure in the ($x$) direction is graphically depicted in FIG. 3.

Figure 6:
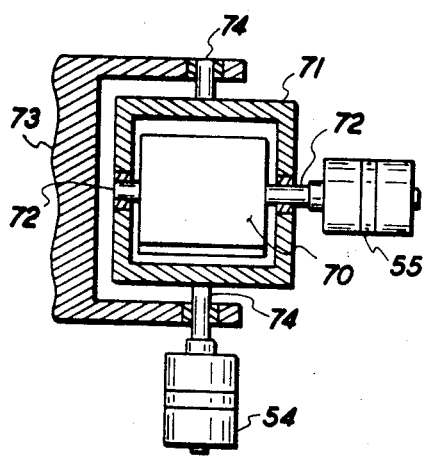
FIG. 6 is a partial sectional view showing a second arrangement by which the fringe pattern can be scanned in the recording plane of the present invention.

Although the present invention is described in reference to an exposure pattern having a gaussian shaped intensity distribution, it should be clear to one skilled in the art that the instant apparatus is capable of producing a uniform exposure of a stable interferometric line pattern in the readout plane regardless of the intensity distribution of the exposure pattern. Furthermore, the present invention is not limited as to the specific structure herein disclosed. FIG. 6 illustrates an arrangement by which the movement of the exposure pattern in the recording plane can be controlled by a single plate element. As shown, plate 70 is rotatably supported in unsplit beam of laser light within a gimbal ring 71 a segmented shaft 72. The gimbal ring, in turn, is similarly supported within a support frame 73 upon segmented shaft 74. The shafts 72 and 74 are arranged so that their axial centerlines lie in planes that are substantially normal to each other. Reversible stepping motors 54 and 55, as herein described, are directly coupled to the shafts and serve to move the plate over a programmed path of travel in the manner wherein the exposure pattern is scanned in both the ($x$) and the ($y$) directions in the readout plane. While this invention has been described with reference to the structure disclosed herein, it is not confined to the details as set forth and this application is intended to cover any modifications or changes as may come within the scope of the following claims.

What is claimed is:

1. In apparatus of the type for producing an illuminated interferometric line pattern in a recording plane including an illumination source for directing a collimated beam of coherent light incident upon a beam splitter and having light redirecting means for superimposing the split beams of light in the recording plane to produce a set of light interference fringes therein, the improvement comprising
    optical means to displace the original unsplit beam of light from the original beam position to an offset beam position, the offset beam of light being substantially parallel to the original beam of light, whereby the illuminated fringe pattern is moved in the recording plane, and
    control means operatively associated with said optical means to regulate the displacement of said original beam to scan the illuminated interferometric line pattern in the recording plane to produce a uniform exposure of the fringe pattern in said plane.

2. The apparatus of claim 1 wherein said optical means comprises a light transmitting element having a flat light receiving surface and a flat light exiting surface, the surfaces being substantially parallel to each other, and being arranged to rotate through the original unsplit light beam.

3. The apparatus of claim 2 wherein said light transmitting element is arranged to rotate in more than one plane.

4. The apparatus of claim 2 wherein said light transmitting element rotates in two planes that are substantially normal to each other.

5. In apparatus of the type for producing an illuminated interferometric line pattern in a recording plane including an illumination source for directing a collimated beam of coherent light incident upon a beam splitter and having light redirecting means for superimposing the split beams of light in recording plane to produce a set of light interference fringes therein, the improvement comprising a light transmitting element having two substantially flat surfaces thereon being substantially parallel to each other, means for rotatably supporting said element about two perpendicular axis of rotation with one of said flat surfaces in light receiving relation with the said original unsplit beam of light, drive means to rotate said element about said axes of rotation to laterally displace the original light beam incident thereon to a displaced beam position, said displaced beam being substantially parallel to the original beam, whereby the illuminated line pattern is scanned in the recording plane, and control means to regulate the rate of rotation of said transparent element about said axis to produce a uniform exposure of said illuminated interferometric light pattern in the recording plane.

6. The apparatus of claim 5 wherein said light transmitting element comprises a single glass plate mounted in a gimbal.

7. The apparatus of claim 5 wherein said drive means comprises a pair of reversible stepping motors being arranged to rotate said glass plate about the two perpendicular axes of rotation.

8. The apparatus of claim 7 wherein said control means comprises a phase generator operatively associated with each of said stepping motors, said phase generators being programmed to move said motors through a predetermined path of travel whereby the superimposed light beams are translated in the recording plane to produce a uniform exposure of the interferometric line pattern therein.

9. In apparatus of the type for producing an interferometric line pattern in a recording plane including an illumination source for directing a collimated beam of coherent light incident upon a beam splitter and having light redirecting means for superimposing the split beams of light in a recording plane to produce a set of light interference fringes therein, the improvement comprising the first glass plate having flat and parallel light entrance and light exit surfaces, said plate being repositionable in the original unsplit light beam directed from said source, a second glass plate having flat and parallel light entrance and light exit surfaces, said second plate being repositionable in the light beam leaving said first plate, drive means operatively associated with each of said glass plates to reposition the light entrance surfaces thereon in said respective light beams to laterally displace the entering light beam, the displaced exiting light beam being parallel to the entering light beam, whereby the illuminated fringe pattern is moved in the recording plane, control means operatively connected to each of said drive means to regulate the rate of displacement of each of said plates to scan the illuminated interferometric line pattern in the recording plane to produce a uniform exposure of the line pattern in said plane.

10. The apparatus of claim 9 wherein said drive means comprises a reversible stepping motor.

11. The apparatus of claim 10 wherein said control means comprises a pulse generator programmed to move said plates through a predetermined path of travel.

* * * * *